United States Patent
Sandell

(10) Patent No.: US 6,282,532 B1
(45) Date of Patent: Aug. 28, 2001

(54) DEVICE AND METHOD FOR MULTIDIMENSIONAL PATTERN ANALYSIS

(75) Inventor: Göran Sandell, Alingsås (SE)

(73) Assignee: Analysity AB, Alingsas (SE)

( * ) Notice: Subject to any disclaimer, the term of this patent is extended or adjusted under 35 U.S.C. 154(b) by 0 days.

(21) Appl. No.: 09/230,255

(22) PCT Filed: Jul. 7, 1997

(86) PCT No.: PCT/SE97/01234

§ 371 Date: Feb. 22, 1999

§ 102(e) Date: Feb. 22, 1999

(87) PCT Pub. No.: WO98/04981

PCT Pub. Date: Feb. 5, 1998

(30) Foreign Application Priority Data

Jul. 22, 1996 (SE) ................................................. 9602834

(51) Int. Cl.[7] ...................................................... G06F 17/30
(52) U.S. Cl. .................................. 707/1; 707/7; 707/103
(58) Field of Search .................................... 707/1, 7, 103

(56) References Cited

U.S. PATENT DOCUMENTS

| | | | |
|---|---|---|---|
| 5,339,257 | 8/1994 | Layden et al. | 702/84 |
| 5,781,896 | * 7/1998 | Dalal | 707/2 |
| 5,893,090 | * 4/1999 | Friedman et al. | 707/3 |
| 5,991,751 | * 11/1999 | Rivette et al. | 707/1 |
| 6,065,014 | * 5/2000 | Wakin et al. | 707/104 |

FOREIGN PATENT DOCUMENTS 9515628    6/1995 (WO) .

OTHER PUBLICATIONS

"Anvandarhandbok Microsoft Works for Windows version 3.0", Microsoft Corporation, Jan. 1993, sid. 361–373.

* cited by examiner

*Primary Examiner*—Jack Choules
*Assistant Examiner*—Cheryl Lewis
(74) *Attorney, Agent, or Firm*—Birch, Stewart, Kolasch & Birch, LLP

(57) ABSTRACT

The present invention concerns a device and a method for pattern analysis of large volumes of data in order to make it possible to distinguish tendencies to co-variations and developments in time from one large database, preferably one composed by a number of smaller databases. The data in the database is divided into on the one hand objects and on the other variables. The method is characterized by first grouping the volume of data, whereby the variables are grouped to dimensions and objects to categories based on a variable or a dimension, by thereafter storing the aggregated database thus formed, by sorting the database with respect to dimensions and categories in order to position similar dimensions and categories in proximity to one another and by graphically presenting the volume of data, the grouping parameters, the sorting parameters, and the presenting parameters being controlled by the user, and by repeating the method the desired number of times while changing one or several of the parameters mentioned.

7 Claims, 3 Drawing Sheets

DEVICE AND METHOD FOR MULTIDIMENSIONAL PATTERN ANALYSIS

This application is the national phase under 35 U.S.C. §371 of prior PCT International Application No. PCTSE97/01234 which has an International filing date of Jul. 7, 1997 which designated the United States of America.

TECHNICAL FIELD

The present invention relates to a device and a method for multi-dimensional pattern analysis of large volumes of data in order to make it possible to distinguish tendencies to co-variations, complex causal connections and developments in time from a large database, preferably one composed by a number of smaller bases.

BACKGROUND

In latter years, there has been a growing interest in the possibility of being able to rapidly gather an overall picture of large amounts of data. This is due among other things to the increase of the data volumes in the society today and to the fact that nowadays it is possible to link different databases in an integrity-protected way. The traditional way of processing large data volumes is to strip information, step by step. For instance, database searches generally are carried out by initial selection of a specific geographical area, followed by selection of individuals of a specified age and income level, and so on, until only a manageable number of items remains.

For example, the U.S. Pat. Nos. 5,276,774, 5,377,348 and 5,136,523 disclose methods and devices for database searches. A feature common to all these publications is, however, that the user must begin by specifying the sought-after information, whereupon the search can be performed by matching the specified search data with the contents of the database, and the hits be presented to the user.

The disadvantage of this manner of processing data is, however, that the criteria of the search largely govern the search results, which is not very suitable when the target information of the search is not exactly clear from the start. In addition, it is difficult in a large database to be able to have an overall view of the data volume which would allow discovery of tendencies to co-variations of different parameters or trends and tendencies in time.

Some essential areas, such as environment, social economics, welfare development, publich health, commercial and industrial development and so on, cannot be understood from traditional measurements of individual variables, since by nature they involve a large number of different actors and a host of interacting variables within different dimensions. An understanding thereof may be achieved only if an overall view may be obtained as to how the total interplay between all these actors, variables and dimensions manifest themselves and result in co-variations, complex causal connections, development progress and patterns.

Generally speaking, coincidences in time and space may be referred to as events. The structure or processes affecting these events may be referred to as changes (forms of event) whereas the form of the changes, i.e. the manner and direction of these changes, may be an indication of the processes taking place in the mass of events. If several such processes move isomorphically, you have a pattern or a pattern-like behaviour. To search for such pattern-like changes in time in large data volumes is not possible by means of the solutions suggested in the above prior art.

In addition, by uniting databases there is an imminent risk that the identity of the objects will be revealed, which not only is unsatisfactory from the viewpoint of the individual's integrity but also results in many databases being restricted. In consequence thereof, the possibilities of linking databases are reduces as are the possibilities of implementing searches in such bases.

OBJECT OF THE INVENTION

The object of the invention thus is to provide a device and a method of searching for patterns in complex multi-dimensional entities (data volumes), preferably composed of several databases, in order to thus discover tendencies for co-variation and changes in time.

This object is achieved by means of a device of the kind defined in claim 1 and a method of the kind defined in claim 7. Preferred embodiments of the invention are defined in the dependent claims.

DESCRIPTION OF PREFERRED EMBODIMENTS

The invention will be described in more detail in the following for exemplifying purposes with reference to the accompanying drawings.

The invention comprises a central database 1, which may be of considerable size as a result of linking via digital networks. Preferably, the database is integrity protected in the sense that information may be entered with respect to the different objects in the register while at the same time information regarding specific individuals can be retrieved only in aggregated form. Such integrity-protected databases are already known, for instance from the Swedish Specification No. 501 128.

Figure 1:
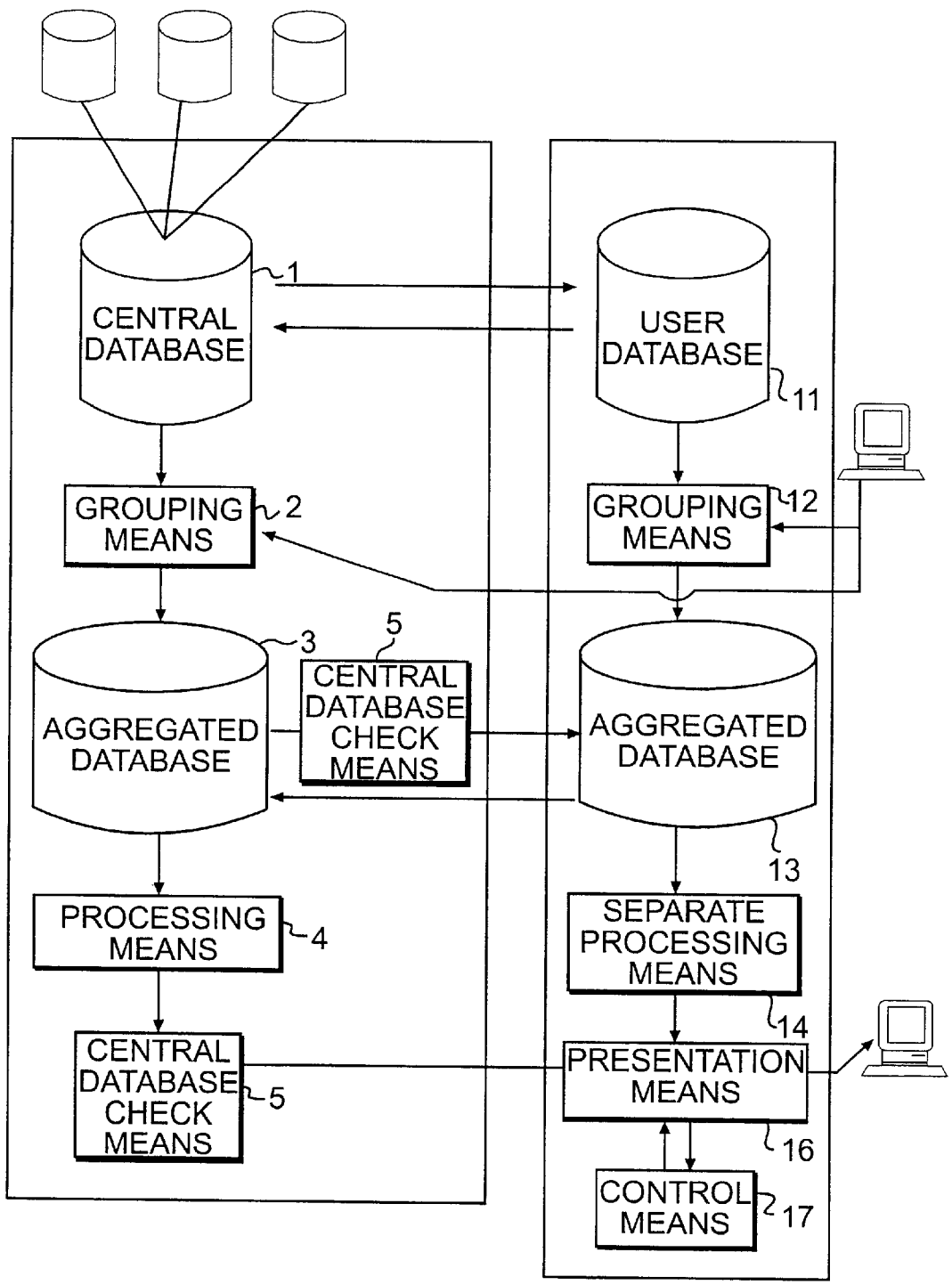
FIG. 1 is a schematical representation of one embodiment of a device for pattern analysis in accordance with the invention.
Figure 2:
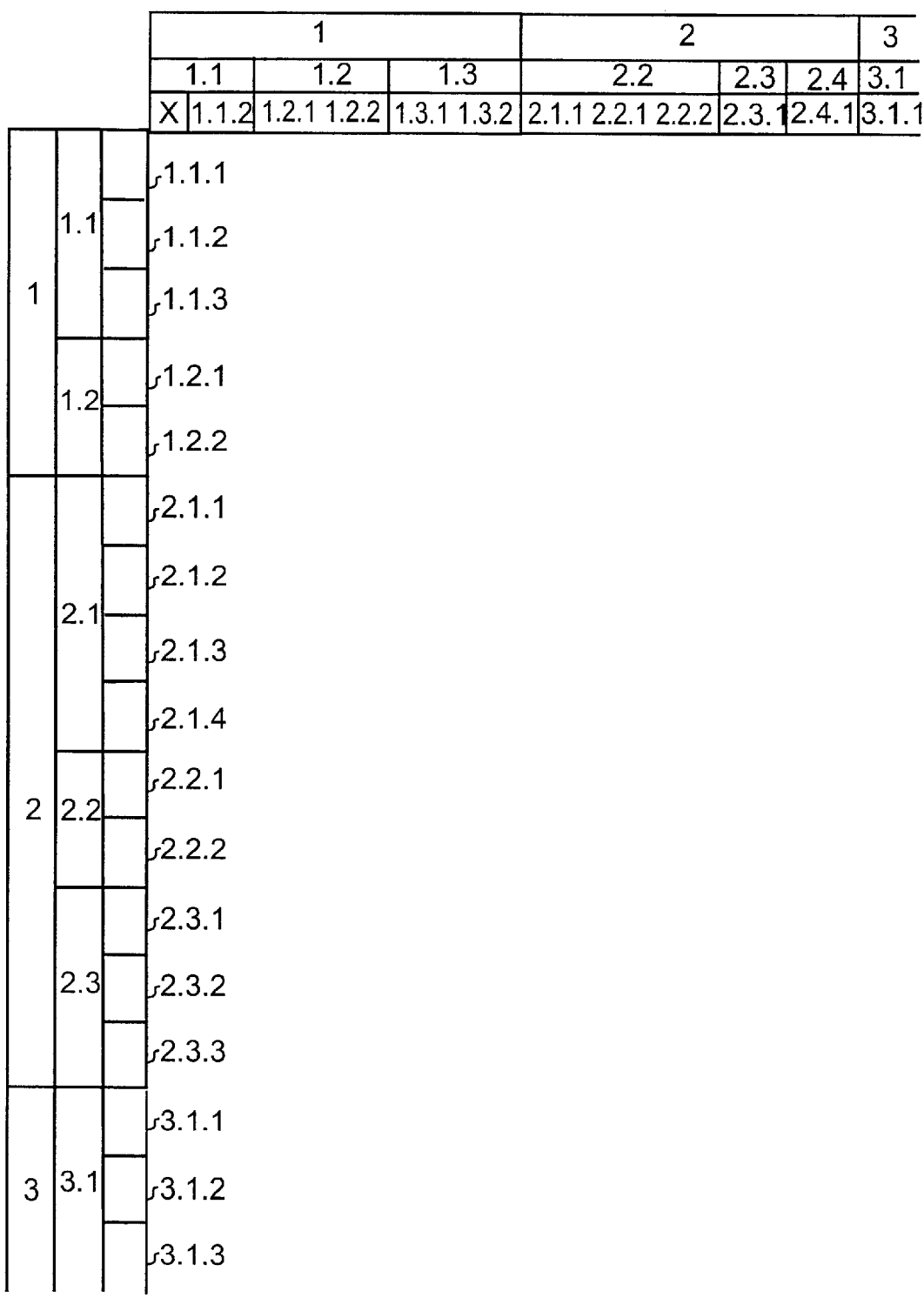
FIG. 2 is a schematical representation of grouping of variables and objects into an aggregated database in accordance with the invention.

In accordance with the invention, the information contained in the database is grouped by means of grouping means 2. The objects (such as different individuals) are grouped into different categories in accordance with a variable chosen by the user, such as geographical area, age, and/or etcetera. In addition, the categorizing may be performed at different levels, it thus being possible, for instance in the case of geographical grouping, to group in categories according to continents, countries, urban areas, and so on. The object grouping is shown schematically by the vertical axis of FIG. 2.

The variables on the horizontal axis could likewise be grouped at different levels. For instance, the variables could be grouped according to subject, such as health, economy, education and so on, in different dimensions. For instance, one variable, "broken ribs", could be categorized under the dimension heading "skeleton injuries", which in turn could be categorized under the higher-level dimension heading "physical illnesses", and so on.

Grouping means 2 may then calculate the combined values relative to the various groupings (average value, median, or the like). In this manner, an aggregated level of values is obtained for the variable groupings 1, 2, 3 and so on and for the various object groupings 1, 2, 3, and so on (see FIG. 2). In principle, a new aggregated database 3 thus is created, containing the aggregated values, which database is of lesser volume and consequently more manageable than the large-size original database. This is important, for instance considering the time needed to transfer the information on the network and the time required to work with the database. This database preferably is stored in a memory.

Thereafter, the device sorts the object groups and the variable groups in order to as far as possible place results of similar or identical pattern close to one another. This is effected by processing means 4.

Thus, the pattern analysis may be effected along two general axes, and possibly a third (time) axis. The measurement objects (such as individuals or individual-related events, for instance) are placed on one of the axes. The objects are categorized according to one or several variables selected by the user, such as variables of a demographic nature. Each unique combination of the values of the grouping variables corresponds to one group of measurement objects, which group thus becomes a new measurement object in the aggregated database.

Variables containing measurements regarding the objects then are placed on the second axis. The grouping may be effected either by subject and explicit content affiliation or by some other previously known pattern, i.e. according to a defined model, in order to make it possible to establish later to which extent the findings are corroborated by data (known as confirmatory factor analysis or path analysis), or by allowing the computer itself to generate a correlation pattern (known as explorative factor analysis). Furthermore, the user should be able to generate further groupings of the objects along the first-mentioned axis along which group affiliation is determined by the degree of proximity in the multi-dimensional space, as implicit from the analysis variables (known as cluster analysis).

Figure 3:
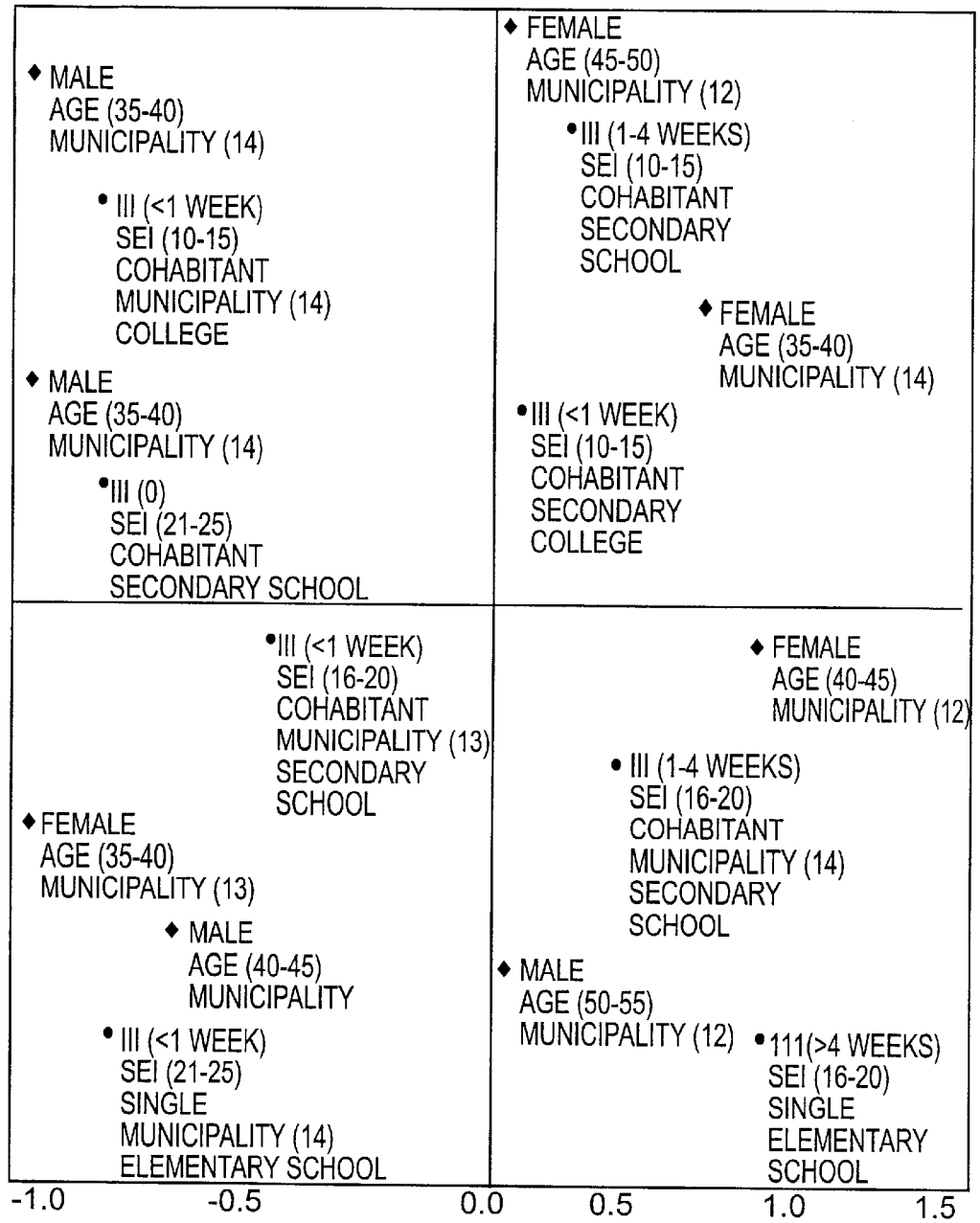
FIG. 3 is a schematical representation of the results obtained from pattern analysis in accordance with the invention, a multi-dimensional quantity of information being represented in a two-dimensional plane.

One example of analysis in accordance with the invention is shown in FIG. 3. Data items are used that comprise:
Horizontal axis
 gender
 age (35–55 years in 5 year intervals)
 municipality
Vertical axis
 sick leave (0; <1 week; 1–4 weeks; >4 weeks)
 SEI code (10–15; 16–20; 21–25; 26–30)
 Marital status (co-habitant, single)
 Education (elementary school, high-school, university
The selection of variables and categories thus comprises 2*4*3=24 horizontal elements that are weighted (coordinated) along the vertical axis, and 4*4*2*3=96 vertical elements that are weighted along the horizontal axis. This multi-dimensional space is reproduced in the plane of the drawing figure by means of new coordinates that are calculated in a manner allowing the original spacings to be retained as far as possible. In the diagram of FIG. 3, "*" indicates the elements on the horizontal axis and "♦" the elements on the vertical axis. The proximity of these is the geometrical expression of the complex numerical relationshhip between the axes.

In the analysis, the spacings between each object in the multi-dimensional space thus is calculated, whereupon the result is projected down to a two-dimensional plane. In this manner, it becomes possible to discern co-variations between the objects, which may give indications of the existence of a pattern structure in the data material.

In addition, the user may combine the resulting groupings or affinity patterns along the axes into a new pattern represented in a two- or three-dimensional space (known as correspondence analysis).

For the various variables, the user may specify that statistical measurements to be obtained for each group (such as frequences of predetermined values, average values, deviation measurements, and so on), all depending on the sought-after purpose.

In summary, the pattern analysis is effected by specifying:
 the variables to be used in order to group the objects in the database;
 which variables contain data relevant to the pattern analysis and what kind of aggregated measurements thereof that is desired; and
 whether separate pattern analysis/analyses or a combination thereof is desired and as the case may be, whether the time axis is to be involved (if comparable measurements exist relating to different periods of time).

The result is presented to the user by means of a presentation means 16, which may comprise a display screen or the like. It is suitable to present the result in a simple graphical from, such as for example dots of different colours and sizes in a two-dimensional picture, in the form of differently coloured arrows indicating tendencies or the like, in the form of a three-dimensional topographical surface, or in the form of a hologram. In this manner, the user may familiarize himself with large amounts of data without having to study and compare tables of figures or the like, a method which in addition to being quicker also provides an improved overall picture of the material.

In this manner, a transition is made from "numerical knowledge" to a graphical overall-view presentation similar to the "natural" function and operation of the human brain in the case of problem-solving, by creating a contextual comprehensive picture. This makes the data presentation user-friendly and improves the possibilities of discerning patterns. For instance, weather changes over a specified period of time in a geographical area are more readily understood from the graphical picture of a changing-weather chart than are several pages of presentation of information on the individual measurement results within the studies variables obtained from all weather stations and weather satellites.

By sorting, it now becomes possible on the one hand to gain an overall picture of the collected data volume on an aggregated level, and on the other to discover similarities between the different groups of objects and variables and thus to identify co-variations and patterns in the total data volume.

It is possible to emphasize the significance of different dimensions and variables may be affected by increasing or reducing sensibility, weighting, degree of magnification and changes in time. In this manner it becomes possible to indicate that some groups of variables or groups of objects are to enjoy a higher degree of priority than others with respect to the sorting, i.e. they should be weighted. Alternatively, some groups of variables may also be excluded. It is likewise possible for instance to shift between different aggregation levels and, for instance, to shift from showing a grouping of objects according to continents to magnifying only the grouping "Europe" and subsequently to study the results following a grouping according to nations. These chances are possible because the presentation means 16 comprises control means 17 which affect the presentation of the data volume in response to actuation by the user.

In practical terms such actuation via control means may include either mechanical or digital controls arranged in such a manner that while the graphical presentation of the data volume is on display it is possible to increase or reduce the various parameters by e.g. turning a nob, indicate plus or minus fields, or the like.

Graphically, changes in time may be presented to the user e.g. by differently coloured arrows that indicate trends and tendencies, or by showing the pattern structure at different times in chronological order.

Thereafter, it is possible to return to the database for further and deeper analysis, allowing for instance a certain group of objects (individuals) that show an interesting pattern of co-variations or changes in time to be studied more thoroughly. It is likewise possible to re-run the method using completely or partly changed input parameters with respect to grouping, etcetera.

In the processing and analysis activities it is, of course, quite possible to use already known mathematical/statistical methods for multi-variable factor analysis, rotation methods, and so on.

The present invention allows the user to connect to a central database in a convenient manner, and after having inputted grouping variables and so on, to create an aggregated database which is transferred in its entirety from the central unit to the user unit for subsequent processing by means of a user-unit related, local processing means 14, which becomes possible because the aggregated database 3 is a great deal smaller and more manageable than the original database 1. By means of a central processing unit 4, the user may also process the aggregated database 3 without transferring it, by means of a central processing unit 4, whereafter only the results are transferred to the user. In this manner the volume of data needed to be transferred via the digitial network interconnecting the user unit and the central unit is further reduced, but at the same time the continued processing of the database and of the results will be more time-consuming. The latter applies also if the user unit and the central unit are directly interconnected.

When operating with external databases it should be clear already from the initial contact just how the database is structured and which variables, values and so on are available. In addition, the user interface may be of a kind requiring that the user first specifies his wishes whereupon these are reduced on the basis of available data. The interface may also comprise translation functions performing translations between different database languages, and consequently the user can always use the same language, irrespectively of which database he works with.

In order to safeguard the integrity protection feature in the central database check means 5 of a kind comprising a safety blocking feature (repression order) should be provided, making sure that variables having fewer hits than e.g. n=10 are screened off and not shown to the user. This feature guarantees that the user will not have access to individual-related information of a nature endangering that the identity of the objects can be revealed.

The central database 1, which in itself may comprise several smaller databases, could advantageously be used together with the user's own database 11 installed in the user unit, to which the user may have access, possibly without an integrity protection feature being installed.

When working with two databases, the central one 1 and the user's own one 11, data transfer may be effected at three different occasions. At the start-up of the work, one of the databases may be connected to the other one. For transfer-technical reasons as also on account of the need to maintain strong integrity-protection it is in this case probably just a question of transferring the user's personal database to the central one.

A second possibility is to group the databases individually, using separate grouping means 2 and 12 and later, in the same manner as mentioned above, uniting the thus formed aggregated databases 3 and 13.

A third possibility is to also process the two aggregated databases 3 and 13 individually, by means of separate processing means 4, 14, but to thereafter unite the results before these are presented.

In order to solve the problem connected with different types of measurement scales that often co-exist with respect to the various variables in databases, it is necessary either to distinguish the different, existing measurement scales as the results are being presented, for instance by using different colours, or else the grouping means 2, 12 changes the scales of the variables that are united into dimensions, so that they become identical in type. The higher types of the scales are transformed into the lowermost one, for example quotient scales being transformed into interval scales that may be transformed into ordinal scales, and so on. The lowermost types of scales, designations and categories may be formed by specifying that values above a certain limit value are to be designated in one way and those below this limit value in another way, or that a certain limit value must be exceeded in order for this phenomenon to be registered at all.

Another possibility is to separate "facts" (in a logical empirical scientific meaning), such as for example actually measured blood pressures, from interests, opinions, attitudes, values, experiences, and so on (from a more hermeneutical perspective of understanding), for example the object's "well-being" (a experienced/estimated by him/herself). It is likewise of essence to be able to distinguish contextual "background information", such as e.g. demographical conditions, from the needs of certain target groups, "problems", needs for change, and so on, from current measures, achievements deriving from certain activities, organization, production processes, etcetera, as well as from the outcome, effects, results, benefit, etctera for the target group concerned.

It is furthermore possible, in the case of presentation with the aid of the presentation means 16, to indicate different types of scales relating to the different dimensions, by means of e.g. different colours, in order thus to make the user aware of this fact. Alternatively, all variables may be transformed already from the start to the same type of scales (i.e. the lowermost scale held by one of the variables).

The invention lends itself to a number of different applications:

- When an individual computer is used the user's own basic data maybe processed by means of the user's own grouping or processing means for pattern analysis.
- Data may be imported, either in aggregated form or direct, and the processing thereafter be continued in the user's own unit.
- By means of digital networks, it becomes possible to use databases as well as grouping and processing means in the central unit. This may be achieved also by means of public networks, such as Internet.
- For instance, the central database may be positioned in an "Internet-Service-Provider" or in an intranet server, and a system user may for instance be a simple type of Internet-Client-Workstation with graphic facilities. A complementary analysis of the information may be performed in e.g. a laptop personal computer not being directly connected to the central database.

One advantage of the invention is the possibility it affords of allowing reliable, controlled and integrity-protected pattern analysis in order to study co-variations, complex causal connections and development processes from limited activity-specific data volumes to very large linked databases containing a large number of different object categories and outcome dimensions.

The invention also facilitates detection, analysis and graphical presentation of differences between patterns. Such differences could concern different categories (e.g. different populations or groups of patients for investigation) within the same variables and dimensions (e.g. health variables), or concern changes over time regarding the volume, importance, weight etc. between different variables and dimensions within the same category (group of persons). This could be of use in cases of evaluation, e.g. in social service and healthcare, where differences of volume, importance, weight etc within the same variables and dimensions is studied over time in the same category of persons, e.g. when pattern in a need-analysis (with individual related codified data in aggregated form) prior to a certain program or treatment is compared with the patterns in an outcome follow-up study after this program/treatment. Hence, the pattern analysis according to the invention could be useful for evaluation of certain activities and the like. Another possible use is in cases of studies where data is originally gathered in a graphical form, e.g. sociograms, gerogrmas, family climate "spider"-diagrams, certain projective psychological tests etc.) to facilitate aggregation, search for patterns and analysis of differences between patterns.

Although in substance apparent from the above, one method for pattern analysis will be described separately in the following. A first step included in the method is initially to group the data volume, by grouping variables into dimensions and grouping objects into categories on the basis of a variable or a dimension. A second step involves storing the thus formed aggregated database and sorting the database with respect to dimensions and categories in order to position similar dimensions and categories in close proximity to one another. Finally, the method comprises the step of graphically presenting the data volume, under the control by the user of the grouping parameters, the sorting parameters and the presentation parameters. The method is then repeated the desired number of times, together with a change of one or some of the indicated parameters, until the results required by the user are obtained.

The method and the device in accordance with the invention consequently provide the following possibilities, vis.:

to obtain an overall graphical presentation of co-variations, causal connections and development patterns;

to "experiment" with all or part of the data volume by emphasizing/clarifying certain conditions by means of e.g. changes in weighting, degree of magnification, shift of perspective, thus providing a clearer picture of co-variations and development processes. For instance, it becomes possible to investigate the conditions required to obtain changes of production processes, working environment and so on, if more importance is attributed to the the variable "health", or to what will be the result with regard to quality, sick-leave or customer satisfaction, or the like, should the competence requirements, staff authority, and work organisation be changed;

to effect deepened and more specific studies of certain conditions or to repeat the pattern analysis under partly changed conditions, for instance while employing a new category classification or different variable dimensions.

What is claimed is:

1. A device for multi-dimensional pattern analysis of large volumes of data in a large database (1, 11) in order to distinguish tendencies to co-variations, complex causal connections and developments in time, the data in the database being divided into objects and variables, the device comprising: grouping means (2, 12) for user-controlled grouping of variables to dimensions and of objects to categories, said object-grouping adapted to be effected according to a variable or a dimension, a memory for storing the thus formed aggregated database (3, 13), processing means (4, 14) for sorting the items of the aggregated database (3, 13), and a presentation means (16) comprising control means (17), said presentation means (16) being arranged to graphically present the contents of the aggregated database (3, 13), and the control means (17) serving to control the presentation.

2. The device as claimed in claim 1, wherein only the aggregated database (3, 13), or higher aggregated levels, is transferred from a central unit to a user unit via digital networks.

3. The device as claimed in claim 2, wherein prior to the transfer of the aggregated database (3) to a user, a checking means (5) performs an integrity check of said database, whereby smaller groupings of objects than a predetermined minimum number cannot be distinguished from the data volume.

4. The device as claimed in claim 1, wherein at least one of the databases concerned is integrity-protected in a manner ensuring that the identities of the objects cannot be revealed.

5. The device as claimed in claim 1, wherein the device is arranged to unite several separately processed databases (3, 13) on aggregated levels.

6. The device as claimed in any one of the preceding claims, wherein the device it is arranged simultaneously to operate with several different types of scales, by said grouping means (2, 12) transforming certain types of scales to lower ones for the purpose of uniformity within the groups, and by the presentation means (16) marking variables of different scale types in a distinguishable way.

7. A method for multi-dimensional pattern analysis of large volumes of data in a large database (1, 11) in order to distinguish tendencies to co-variations, complex causal connections, and development in time, comprising the steps of: first grouping the volume of data, whereby the variables are grouped to dimensions and objects to categories based on a variable or a dimension, by thereafter storing the aggregated database thus formed, by sorting the database with respect to dimensions and categories in order to position similar dimensions and categories in proximity to one another and by graphically presenting the volume of data, the grouping parameters, the sorting parameters, and the presenting parameters being controlled by the user, and by repeating the method a desired number of times while changing one or several of the parameters mentioned.

* * * * *